(12) United States Patent
Miller et al.

(10) Patent No.: US 9,342,471 B2
(45) Date of Patent: May 17, 2016

(54) HIGH UTILIZATION MULTI-PARTITIONED SERIAL MEMORY

(75) Inventors: Michael J. Miller, Saratoga, CA (US); Richard S. Roy, Dublin, CA (US)

(73) Assignee: MoSys, Inc., Santa Clara, CA (US)

( * ) Notice: Subject to any disclaimer, the term of this patent is extended or adjusted under 35 U.S.C. 154(b) by 451 days.

(21) Appl. No.: 12/697,141

(22) Filed: Jan. 29, 2010

(65) Prior Publication Data

US 2011/0191548 A1    Aug. 4, 2011

(51) Int. Cl.
*G06F 12/00* (2006.01)
*G06F 13/16* (2006.01)

(52) U.S. Cl.
CPC .................. *G06F 13/1647* (2013.01)

(58) Field of Classification Search
CPC .................................. G06F 13/1647
See application file for complete search history.

(56) References Cited

U.S. PATENT DOCUMENTS

| | | | | |
|---|---|---|---|---|
| 5,432,823 A | * | 7/1995 | Gasbarro et al. | 375/356 |
| 5,452,429 A | * | 9/1995 | Fuoco et al. | 714/6.1 |
| 5,948,089 A | * | 9/1999 | Wingard et al. | 710/107 |
| 7,167,410 B2 | | 1/2007 | Boecker et al. | |
| 7,363,422 B2 | | 4/2008 | Perego et al. | |
| 7,366,931 B2 | | 4/2008 | Vogt | |
| 7,522,468 B2 | | 4/2009 | Norman | |
| 7,539,810 B2 | | 5/2009 | Gower et al. | |
| 8,209,458 B1 | * | 6/2012 | Keren | H04L 49/9078 711/105 |
| 2003/0198089 A1 | * | 10/2003 | Morikawa | G11C 11/417 365/189.09 |
| 2004/0148482 A1 | | 7/2004 | Grundy et al. | |
| 2007/0286009 A1 | * | 12/2007 | Norman | 365/230.03 |
| 2007/0288690 A1 | * | 12/2007 | Wang | G06F 13/28 711/105 |
| 2008/0140980 A1 | | 6/2008 | Mei et al. | |
| 2008/0215832 A1 | * | 9/2008 | Allen | G06F 13/4243 711/158 |
| 2010/0235590 A1 | * | 9/2010 | Tam | G06F 13/161 711/149 |

FOREIGN PATENT DOCUMENTS

CN    1581104 A    2/2005

OTHER PUBLICATIONS

Lee et al. "A 128Mb Multi Port Media DRAM with four Independent 4Gb/s Serial Ports", 2004 Symposium on VLSI Circuits Digest of Technical Papers, 2004 IEEE, pp. 34-35.
NASR, Rami Marwan "FBSIM and the Fully Buffered DIMM Memory System Architecture", Thesis submitted to the Faculty of the Graduate School of the University of Maryland, College Park, 2005, 138 pgs.
PowerPC: MPC860P PowerQUICC Technical Summary, Freescale Semiconductor, Inc./Motorola, 1999, 12 pgs.

(Continued)

*Primary Examiner* — Larry Mackall
(74) *Attorney, Agent, or Firm* — Bever, Hoffman & Harms, LLP (57) ABSTRACT

A memory device that includes an input interface that receives instructions and input data on a first plurality of serial links. The instructions and input data are deserialized on the memory device, and are provided to a memory controller. The memory controller initiates accesses to a memory core in response to the received instructions. The memory core includes a plurality of memory partitions, which are accessed in a cyclic and overlapping manner. This allows each memory partition to operate at a slower frequency than the serial links, while properly servicing the received instructions. Accesses to the memory device are performed in a synchronous manner, wherein each access exhibits a known fixed latency.

29 Claims, 8 Drawing Sheets

(56) References Cited

OTHER PUBLICATIONS

Henkels, W. H. et al. "A 500 Mhz 32-Word x 64-Bit 8-Port Self-Resetting CMOS Register File and Associated Dynamic-to-Static Latch", 1997 Symposium on VLSI Circuits Digest of Technical Papers, pp. 41-42.

Altera Excalibur Device Overview, Altera Corporation, May 2002, Ver. 2.0, 16 pgs.

Tsang, Tony et al. "A 32Kbs On-chip Memory with High Port-Multiplicity (5 Reads and 2 Writes) for Effective Implementation of Shared Memory Systems", IEEE 1998, 6 pgs.

Mehrotra et al. "Serial 9Mb Flash EEPROM for Solid State Disk Applications", 1992 Symposium on VLSI Circuits Digest of Technical Papers, 1992 IEEE, pp. 24-25.

Micron DDR2 SDRAM FBDIMM, Data Sheet, Micron Technology, Inc., 2004, 36 pgs.

David, Howard et al. "Fully Buffered DIMM (FB-DIMM) Design Considerations", Intel Corp., Feb. 18, 2004, 36 pgs.

National Semiconductor, EEPROM Memory Databook, 1996 Edition, pp. 1-149, 1-170-1-179.

Texas Instruments, High-Performance FIFO Memories, Designer's Handbook, 1996, pp. 3-185-3-191.

Integrated Device Technology, Inc., "IDT Samples Advanced Memory Buffer Products to Multiple FB-DIMM Suppliers", News Release, Dec. 13, 2004, http://www.idt.com/?id=604, 2 pgs.

NEC Electronics, "NEC Electronics Announces New Advanced Memory Buffer", Press Release, Sep. 7, 2004, 2 pgs.

Haas, Jon et al. "Fully-Buffered DIMM Technology Moves Enterprise Platforms to the Next Level", Technology@Intel Magazine, Mar. 2005, pp. 1-7.

\* cited by examiner

HIGH UTILIZATION MULTI-PARTITIONED SERIAL MEMORY

FIELD OF THE INVENTION

The present invention relates to a memory device that includes a serial interface and multiple memory partitions, and operates in a synchronous manner.

RELATED ART

Traditional memories have used multiple memory partitions to limit the lengths of bit lines and data/address busses. By limiting the lengths of bit lines and data/address busses, the operating frequency of the memory can be increased.

Conventional multi-partition SRAM devices typically have an external device address/data bus that is sized to match the random access bandwidth of an individual memory partition. In these multi-partition SRAM devices, only one of the memory partitions can be active at a time.

Conventional multi-partition DRAM devices, such as reduced latency DRAM (RLDRAM), typically have an external device address/data bus bandwidth that is a multiple of the random access bandwidth of an individual memory partition. In these RLDRAM devices, the memory partitions are accessed in a cyclic manner, such that multiple memory partitions can be active at a time.

Memory bandwidth has historically increased at a rapid rate though architectural and process innovation. However, package technology, and more specifically, the input/output (I/O) bandwidth, has not increased as rapidly. Ultimately, the bandwidth of the external address/data bus (BE) will limit the bandwidth of a multi-partition memory device. That is, a multi-partition memory device will have to be designed such that the number of memory partitions times the bandwidth of each of the memory partitions does not exceed the bandwidth of the external address/data bus.

U.S. Pat. No. 7,522,468 to Norman pertains to a memory system that includes a plurality of memory planes and a serial memory interface. However, this memory system is an asynchronous system that undesirably requires arbiters, switches, and a handshaking mechanism between the serial memory interface and the memory planes. Consequently, the access latency of this system is non-deterministic.

It would therefore be desirable to have a multi-partition memory system whose bandwidth is not limited by the bandwidth of the external address/data bus. It would further be desirable for such a multi-partition memory system to operate in a synchronous manner in response to a system clock signal, such that access latency is deterministic.

SUMMARY

Accordingly, the present invention provides a multi-partition memory device that includes a serial interface and operates in a synchronous manner, with a known fixed access latency. Instructions and input data are provided to the memory device at a high frequency (e.g., 10G) on a plurality of serial links. Received instructions and input data are deserialized on the memory device, and are provided to a memory controller. The memory controller initiates accesses to a memory core in response to the received instructions. The memory core includes a plurality of memory partitions, which are accessed in a cyclic overlapping manner. Stated another way, the memory partitions are sequentially accessed during assigned time slots, which are referenced to a system clock signal. Accessing the memory partitions in this manner allows each of the memory partitions to operate at a slower frequency than the serial links, while allowing the memory partitions to properly service the received instructions. Accesses to the multi-partition memory device are performed in a synchronous manner in response to a system clock signal. The access latency of the multi-partition memory system can be specified by a number of cycles of the system clock signal. Advantageously, accesses to the multi-partition memory system of the present invention do not require arbitration.

The present invention will be more fully understood in view of the following description and drawings.

DETAILED DESCRIPTION

Figure 1:
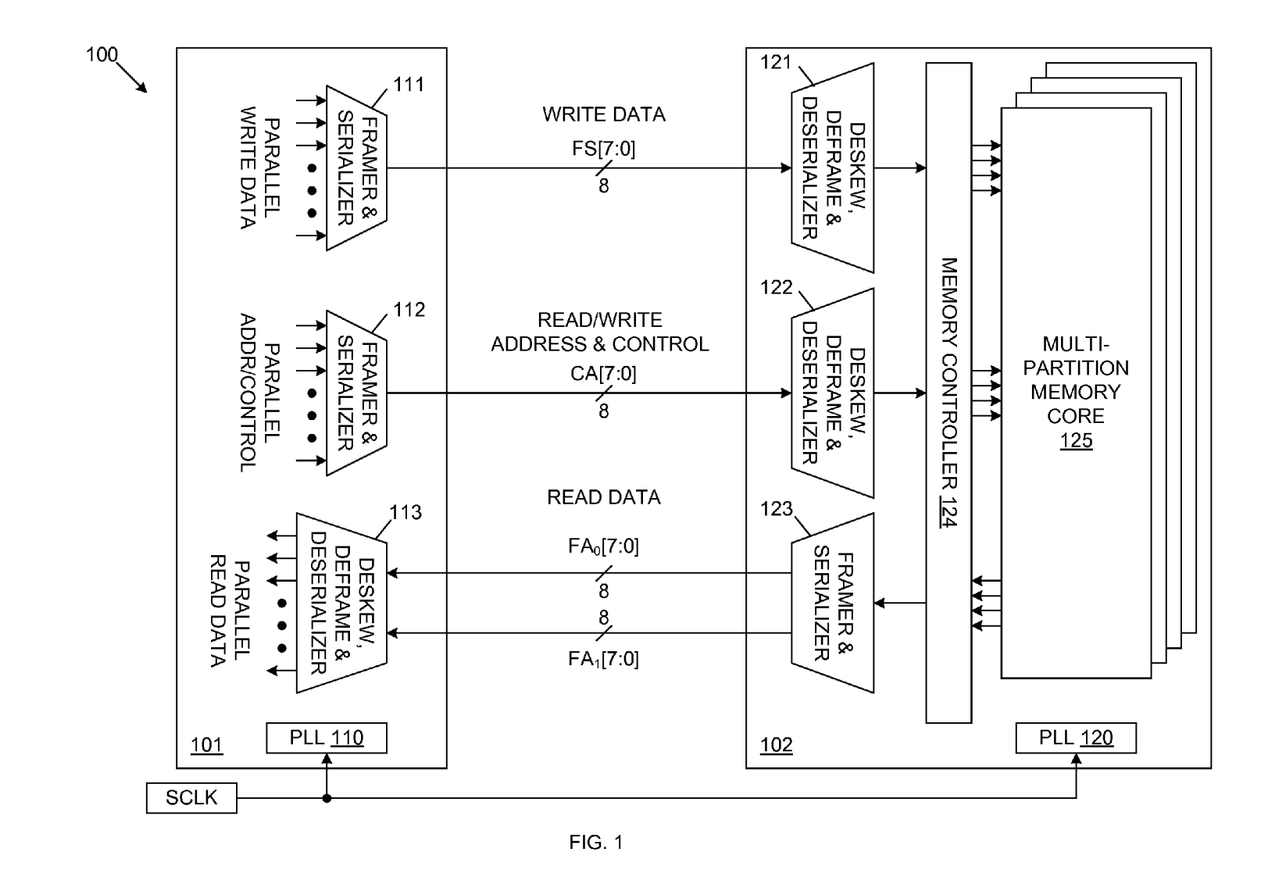
FIG. 1 is a block diagram of a system that includes an accessing device and a multi-partition memory system in accordance with one embodiment of the present invention.

FIG. 1 is a block diagram of a system 100 in accordance with one embodiment of the present invention. System 100 includes an accessing device 101 and a memory device 102. Accessing device 101 may be, for example, a system-on-a-chip (SOC) that includes a processor (not shown) that initiates accesses to memory device 102. Accessing device 101 is coupled to memory device 102 by a plurality of serial links. In the described examples, eight serial links FS[7:0] are used to transmit frame store (write) data from accessing device 101 to memory device 102, and eight serial links CA[7:0] are used to transmit command/address signals from accessing device 101 to memory device 102. Sixteen serial links $FA_0[7:0]$ and $FA_1[7:0]$ are used to transmit frame access (read) data from memory device 102 to accessing device 101. In the described embodiments, each of the serial links implements differential signaling, and transmits information at a rate of 10 Gigabits/second (10G).

Although the present invention is described in connection with a particular number of serial links, which operate at a particular transfer rate, it is understood that other numbers of serial links, and other transfer rates, may be used in other embodiments. Moreover, although the examples described herein use a first set of serial links FS[7:0] to transmit write data and a second set of serial links CA[7:0] to transmit command/address signals, it is understood that a common set of serial links could be used to transmit write data and command/address signals in a time multiplexed manner. For example, the control/address signals associated with a transaction could be sent over sixteen serial links (FS[7:0] and CA[7:0]) during a first time period, and the corresponding write data (if any) could be sent over these same sixteen serial links during a second time period.

Within accessing device 101, framer and serializer block 111 converts parallel write data into serial write data, which is transmitted to memory device 102 on serial links FS[7:0]. Similarly, framer and serializer block 112, converts parallel address/control information into serial data, which is transmitted to memory device 102 on serial links CA[7:0]. Within memory device 102, deskew, deframe and deserializer blocks 121 and 122 receive the serial data on serial links FS[7:0] and CA[7:0], and convert this data to parallel information, which is provided to memory controller 124. In response, memory controller 124 performs accesses to multi-partition memory core 125 as specified by the address/control information received on serial links CA[7:0]. Read accesses result in parallel data being provided from multi-partition memory core 125 to memory controller 124, and then to framer and serializer block 123. Framer and serializer block 123 converts the parallel read data into serial data, which is transmitted to accessing device 101 on serial links $FA_0$[7:0] and/or $FA_1$[7:0]. Deskew, deframe and deserializer block 113 converts the data provided on serial links $FA_0$[7:0] and $FA_1$[7:0] into parallel read data, which is used by accessing device 101.

As described in more detail below, overlapping accesses may be performed in a cyclic random manner within multi-partition memory core 125, such that a relatively high data transfer rate to/from multi-partition memory core 125 is achieved. In the described embodiments, the high data transfer rate provided by the serial links FS, CA and $FA_x$ prevents the interface between devices 101 and 102 from being a limiting factor in transfers between these devices.

Accessing device 101 and memory device 102 include phase lock loops (PLLs) 110 and 120, respectively. PLLs 110 and 120 generate internal clock signals in response to a common system clock SCLK. The internal clock signals generated by PLLs 110 and 120 are used to control the timing of transactions within devices 101 and 102, respectively. The transactions between accessing device 101 and memory device 102 are synchronous with respect to the system clock signal SCLK. That is, when accessing device 101 initiates an access to memory device 102, that access will be completed by memory device 102 with a fixed latency with respect to the system clock signal SCLK. For example, if accessing device 101 initiates a read access, then memory device 102 will perform a corresponding read operation and return a read data value to accessing device with a known latency, which is referenced to the system clock signal SCLK. Similarly, if accessing device 101 initiates a write access, the memory device 102 completes the corresponding write operation with a known latency, which is referenced to the system clock signal SCLK. Advantageously, memory device 102 does not need to perform arbitration of access requests, or engage in handshaking operations with accessing device 101.

In accordance with one aspect of the present invention, the serial links CA[7:0] between accessing device 101 and memory device are used to specify input/output (I/O) transactions in addition to read and write accesses (i.e., compound memory macro operations). As a result, I/O transactions between accessing device 101 and memory device 102 are advantageously made more efficient. For example, accessing device 101 may specify packet operations (pack/unpack, queue/unqueue), statistics operations (increment, decrement), and/or link list operations (insert/delete, follow), which are performed entirely within memory device 102. An exemplary I/O transaction that specifies a statistics operation (i.e., a counter increment function) is described in more detail below.

Figure 2A:
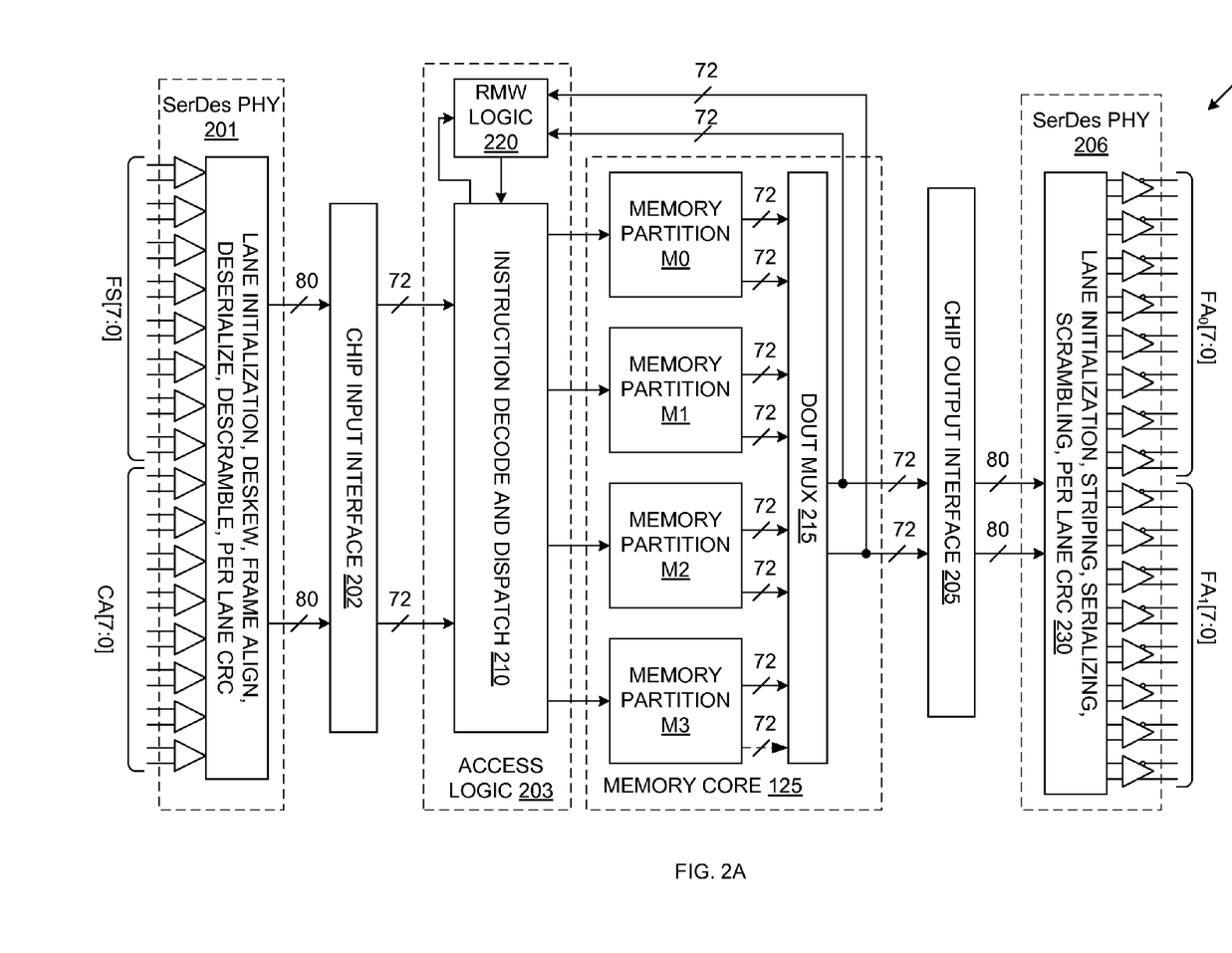
FIG. 2A is a block diagram that illustrates the multi-partition memory system of FIG. 1 in more detail in accordance with one embodiment of the present invention.

FIG. 2A is a block diagram that illustrates memory system 102 in more detail in accordance with one embodiment of the present invention. Memory system 102 includes serial/deserial (SerDes) physical layer interfaces (PHYs) 201 and 206, chip input interface 202, access logic block 203, multi-partition memory core 125 and chip output interface 205. In general, SerDes PHY 201 corresponds with the deskew, deframe and deserializer blocks 121-122 of FIG. 1, and SerDes PHY 206 corresponds with the framer and serializer block 123 of FIG. 1. Chip input interface 202, access logic 203 and chip output interface 205 roughly correspond with memory controller 124 of FIG. 1.

In general, SerDes PHY 201 is coupled to serial links FS[7:0] and CA[7:0], and receives the corresponding write data and address/control information transmitted on these serial links. SerDes PHY 201 performs lane initialization, deskewing, frame alignment, deserialization, descrambling and per lane error correction (CRC) on the received serial data. In the described example, SerDes PHY 201 performs these operations in response to a local bit clock signal, which is generated by PLL 120 in response to the system clock signal SCLK. Upon completing the above-described operations, SerDes PHY 201 provides 80-bit wide values (frames) to chip input interface 202. In the described examples, SerDes PHY 201 provides one 80-bit frame (e.g., write data) from serial links FS[7:0] and one 80-bit frame (e.g., access instructions) from serial links CA[7:0] every ten cycles (i.e., at a frequency of 1 GHz).

Chip input interface 202 performs error checking and correction on the received 80-bit frame values, and in response, provides 72-bit corrected frame values (i.e., 72-bit access instructions and 72-bit write data values) to access logic 203. Chip input interface 202 also performs administrative activities, which may include, for example, maintaining a frame count and requesting the retransmission of frames, if necessary. Chip input interface 202 operates in response to the local bit clock signal, and routes the 72-bit corrected frame values at a frequency of 1 GHz.

Within access logic block 203, instruction decode and dispatch logic 210 receives the 72-bit corrected frame values provided by chip input interface 202. Instruction decode and dispatch logic 210 decodes the 72-bit corrected frame value that was received from command/address serial links CA[7:0], thereby identifying the access operation(s) specified by this 72-bit corrected frame value (i.e., access instruction). These operations may include, but are not limited to: read, write, read-modify-write, and no operation. The 72-bit corrected frame value received from command/address serial links CA[7:0] also identifies the address of the memory partition to be accessed within multi-partition memory core 125. In the described embodiment, multi-partition memory core 125 includes four memory partitions M0-M3. However, it is understood that other numbers of memory partitions can be used in other embodiments. Upon decoding an access instruction in the above-described manner, instruction decode and dispatch logic 210 initiates an access (or accesses) to the memory partition specified by the access instruction.

In accordance with one embodiment, each of the memory partitions in memory core 125 has an operating frequency that is 1/N the frequency at which data is provided to instruction decode and dispatch logic 210, wherein N represents the number of partitions in memory core 125. As described above, the 72-bit corrected frame values are provided to instruction decode and dispatch logic 210 at a frequency of 1 GHz in the described embodiment. In this embodiment, each of the memory partitions M0-M3 operates at a frequency of 250 MHz (i.e., 1 GHz/4). Accesses to memory partitions M0-M3 are initiated during pre-assigned time slots, such that each of the memory partitions M0-M3 receives, at most, one access instruction every four cycles of a 1 GHz clock signal.

In the examples described herein, each of memory partitions M0-M3 is implemented by 64 memory banks, each having the capacity to store 32K entries of 72-bits each. The memory cells within the memory banks can be, for example, single-port DRAM or SRAM cells. Each of the memory partitions M0-M3 includes two 72-bit read data buses. The memory banks in each memory partition are coupled to both of the two 72-bit read data buses associated with the memory partition. As described in more detail below, two different memory banks within a given memory partition may be read simultaneously, with the resulting read data values being provided on the two 72-bit read data buses of the memory partition. As also described in more detail below, a write data value can be written to a first memory bank within a given memory partition, while a read data value can be simultaneously read from a second bank within the same memory partition. In the described examples, each of the memory banks has an operating frequency of 250 MHz. One exemplary method and structure for implementing the memory partitions M0-M3 is described in more detail in commonly owned, co-filed U.S. patent application Ser. No. 12/697,150 to Richard S. Roy and Dipak Sikdar, titled "HIERARCHICAL MULTI-BANK MULTI-PORT MEMORY ORGANIZATION", which is hereby incorporated by reference in its entirety. In an alternate embodiment, each of the memory partitions M0-M3 may be implemented by one (or more) multi-port memory arrays (including, but not limited to, dual-port or tri-port memory arrays, or a combination thereof). For example, each memory partition M0-M3 can be implemented by a conventional multi-port SRAM array, which is capable of performing two simultaneous read operations, or simultaneous read and write operations, as required by the described embodiments.

Memory partitions M0-M3 operate in response to a memory cycle clock having a relatively low frequency (e.g., 250 MHz). The memory cycle clock can be created, for example, by a PLL (not shown), which receives the local bit clock, and in response, generates the memory cycle clock.

Although memory partitions M0-M3 are described as having two read data buses in the described examples, it is understood that each memory partition may have a single read output data bus in other embodiments. Such memory partitions can be implemented, for example, using single-port DRAM or single-port SRAM cells. Moreover, although memory partitions M0-M3 are described as having a plurality of memory banks in the described examples, it is understood that each memory partition may be implemented as a single memory bank in other embodiments.

Data output multiplexer 215 receives the 72-bit data values read from memory partitions M0-M3. Instruction decode and dispatch logic 210 controls data output multiplexer 215 to route the 72-bit data values read from memory partitions M0-M3. In the described example, data output multiplexer 215 routes the 72-bit data values (or pairs of 72-bit data values) read from memory partitions M0-M3 at a frequency of 1 GHz. More specifically, data output multiplexer 215 routes data read from memory partitions M0-M3 in a cyclic manner, such that read data is routed from different memory partitions during successive cycles of a 1 GHz local bit clock signal, and such that data output multiplexer 215 routes data from a particular memory partition, at most, once in every four cycles of the 1 GHz clock signal.

The 72-bit read data values routed by data output multiplexer 215 are provided to read-modify-write (RMW) logic 220 and chip output interface 205, as illustrated. As described in more detail below, RMW logic 220 may modify read data values provided by data output multiplexer 215, thereby implementing specific I/O transactions (e.g., read-modify-write).

Although access logic block 203 is shown including instruction decode and dispatch logic 210 and RMW logic 220, it is understood that access logic block 203 may also include other conventional logic, including, but not limited to, a serial peripheral interface, error registers, a JTAG interface, BIST circuitry and/or fuses.

Chip output interface 205 receives the 72-bit read values provided by data output multiplexer 215, and in response, generates 80-bit output frame values. For example, chip output interface 205, may add a layer ID bit, a packet ID bit, and a 6-bit CRC value to the received 72-bit read values to create 80-bit output frame values. Chip output interface 205 may also perform administrative activities, which may include maintaining a transmitted frame count and storing transmitted frame information in a replay buffer for possible re-transmission.

The 80-bit output frame values provided by chip output interface 205 are routed to SerDes PHY 206. In response, SerDes PHY 206 performs lane initialization, striping, serializing, scrambling and per lane CRC on the received 80-bit output frame values. SerDes PHY 206 provides the resulting 80-bit frame values to serial links $FA_0[7:0]$ and/or $FA_1[7:0]$ over a period of ten cycles (i.e., at a frequency of 1 GHz). Note that if only one 80-bit output frame value needs to be returned to accessing device 101 (because only one 72-bit read data value was previously retrieved from one of the memory partitions M0-M3), then this 80-bit output frame value is transmitted over 8 serial links (e.g., $FA_0[7:0]$) over a period of ten cycles.

Figure 2B:
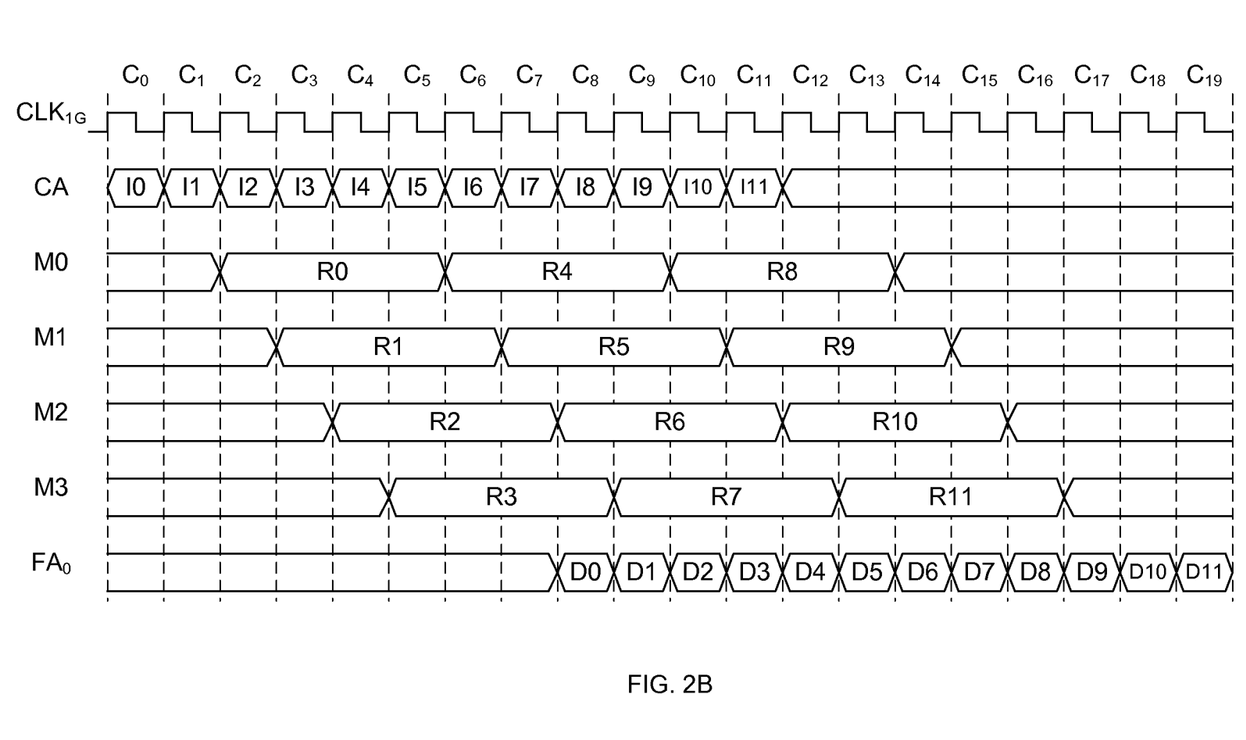
FIG. 2B is a waveform diagram that illustrates the manner in which the multi-partition memory system of FIG. 2A is accessed in accordance with one embodiment of the present invention.

FIG. 2B is a waveform diagram illustrating cyclic overlapping accesses to memory partitions M0-M3 in accordance with one embodiment of the present invention. As illustrated in FIG. 2B, read instructions I0-I11 are provided on serial links CA[7:0] at a frequency of 1 GHz. More specifically, read instructions I0-I11 are provided during cycles $C_0$-$C_{11}$, respectively, of a 1 GHz clock signal $CLK_{1G}$. Read instructions I0-I11 specify memory partitions M0-M3 in a cyclic manner, such that each memory partition is accessed once every four cycles of the clock signal $CLK_{1G}$. In the illustrated example, read instructions I0, I4 and I8, which specify memory partition M0, are provided during time slots defined by cycles $C_0$, $C_4$ and $C_8$; read instructions I1, I5 and I9, which specify memory partition M1, are provided during time slots defined by cycles $C_1$, $C_5$ and $C_9$; read instructions I2, I6 and I10, which specify memory partition M2, are provided during time slots defined by cycles $C_2$, $C_6$ and $C_{10}$; and read instructions I3, I7 and I11, which specify read operations to memory partition M3, are provided during time slots defined by cycles $C_2$, $C_7$ and C.

Read operations R0-R11 are performed within memory partitions M0-M3 as illustrated, wherein each read operation is performed over four cycles of the clock signal $CLK_{1G}$ (i.e., at a frequency of 250 MHz). Read operations within different memory partitions M0-M3 are performed in an overlapping manner. For example, read operations R0, R1 and R2 are all being performed during cycle $C_5$ within memory partitions M0, M1 and M2, respectively. In the waveform diagram of FIG. 2B, a two cycle delay exists between the time that the read instructions I0-I11 are received on serial links CA[7:0] and the time that the corresponding read operations are initiated. However, it is understood that other delays may exist in other examples.

The read data values D0-D11 associated with read operations R0-R11, respectively, are routed through data output multiplexer 215 and are provided on serial links $FA_0[7:0]$ during cycles $C_8$-$C_{19}$, respectively, at a frequency of 1 GHz. In the waveform diagram of FIG. 2B, a two cycle delay exists between the time that the read instructions I0-I11 are completed within memory partitions M0-M3 and the time that the corresponding read data values are provided on serial links $FA_0[7:0]$. However, it is understood that other delays may exist in other examples.

As illustrated by FIG. 2B, each access to memory device 102 has a fixed access latency. Thus, in the illustrated example, the accessing device 101 will receive a read data value on serial links $FA_0[7:0]$ eight cycles (of the $CLK_{1G}$ signal) after transmitting a read instruction on serial links CA[7:0].

Other methods of operating multi-partition memory core 125 are described in more detail in commonly owned, co-filed U.S. patent application Ser. No. 12/697,132 to Richard S. Roy, titled "HIERARCHICAL ORGANIZATION OF LARGE MEMORY BLOCKS", which is hereby incorporated by reference in its entirety.

Figure 3:
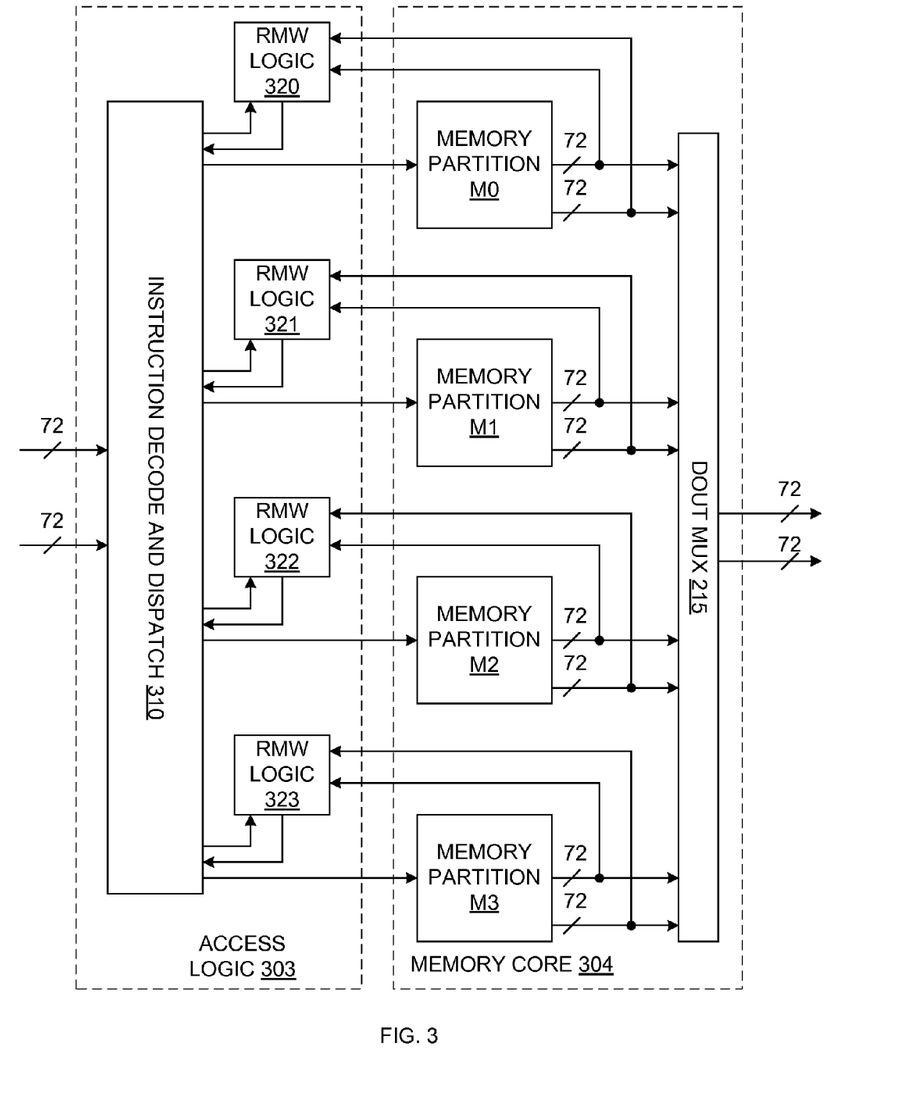
FIG. 3 is a block diagram that illustrates access logic and a memory core, which may replace access the access logic and memory core of FIG. 2A in accordance with one variation of the present invention.

FIG. 3 is a block diagram that illustrates access logic 303 and memory core 304, which may replace access logic 203 and memory core 125 (FIG. 2A) in accordance with one variation of the present invention. In this variation, each of memory partitions M0-M3 has a corresponding RMW logic block 320-323, respectively. RMW logic blocks 320-323 are coupled to receive the 72-bit read data values read from memory partitions M0-M3. As a result, RMW logic blocks 320-323 can operate in a cyclic overlapping manner (under the control of instruction decode and dispatch logic 310), thereby alleviating potential bottlenecks that might be introduced by a single RMW logic block (e.g., RMW logic block 220) that services all of memory partitions M0-M3. Viewed another way, each of RMW logic blocks 320-323 may operate at the same frequency as the corresponding memory partitions M0-M3 (e.g., 250 MHz), while RMW logic block 220 is required to operate at the same frequency as instruction decode and dispatch logic 210 (e.g., 1 GHz).

The operation of memory device 102 will now be described in connection with specific instructions.

Figure 4:
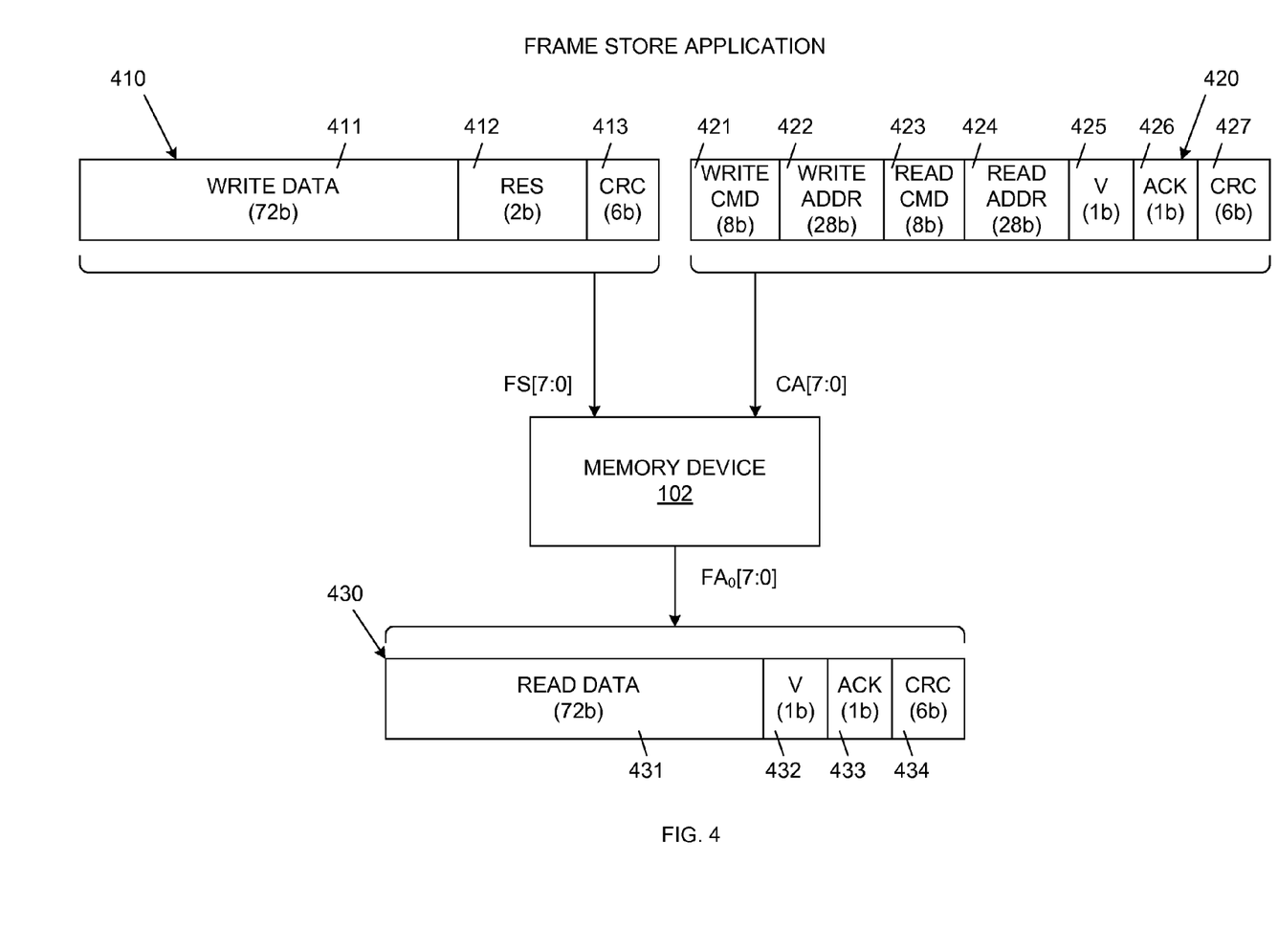
FIG. 4 is a block diagram illustrating a frame store application in accordance with one embodiment of the present invention.

FIG. 4 is a block diagram illustrating a frame store application in accordance with one embodiment of the present invention. A frame store application provides a balanced read/write bandwidth for frame storage. A pair of 80-bit frame values 410 and 420 are provided to memory device 102 on serial links FS[7:0] and CA[7:0], respectively over ten cycles (i.e., at a frequency of 1 GHz). The 80-bit frame value 410 received on serial links FS[7:0] includes a 72-bit write data value 411, a 2-bit reserved field 412, and a 6-bit CRC value 413. The 80-bit frame value 420 received on serial links CA[7:0] includes an 8-bit write command 421, a 28-bit write address 422, an 8-bit read command 423, a 28-bit read address 424, a 1-bit value 425 (which defines the transaction or data linkage layer, and is an instruction value for the memory or interface), a 1-bit acknowledge value 426, and a 6-bit CRC value 427.

The 80-bit frame values 410 and 420 are processed by Serdes PHY 201 and chip input interface 202 in the manner described above, such that instruction decode and dispatch logic 210 receives the 72-bit write data value 411, the 8-bit write command 421, the 28-bit write address 422, the 8-bit read command 423 and the 28-bit read address 424. Instruction decode and dispatch logic 210 simultaneously initiates a write operation in response to the write command 421, and a read operation in response to the read command 423. The write operation causes the 72-bit write data value 411 to be written to the address specified by write address field 422. The read operation causes a 72-bit read data value 431 to be read from the address specified by read address field 424. In the described example, the write operation and the read operation are performed to different memory banks within the same memory partition. However, in other examples, the write and read operations could be performed to different memory partitions. The 72-bit read data value 431 is routed through data output multiplexer 215, and is processed by chip output interface 205 and SerDes PHY 206 in the manner described above, such that valid bit 432, acknowledge bit 433 and CRC bits 434 are added to the 72-bit read data value 431 to create an 80-bit output frame value 430. This output frame value 430 is transmitted from SerDes PHY 206 onto serial links $FA_0[7:0]$ over ten cycles (i.e., at a frequency of 1 GHz). The frame store application exhibits a data transfer rate of 144 Gbps (i.e., 72-bit word at 1 GHz write, and 72-bit word and 1 GHz read). Note that the frame store application can be run continuously, as long as the memory partitions M0-M3 are accessed in a cyclic manner (e.g., frame store operations 0, 1, 2, 3, 4, 5, 6, 7, etc. access memory partitions M0, M1, M2, M3, M0, M1, M2, M3, etc., respectively). Because each of the memory partitions M0-M3 operates at a relatively low frequency (e.g., 250 MHz), power consumption of the frame store application is relatively low, typically less than 7 Watts.

Figure 5:
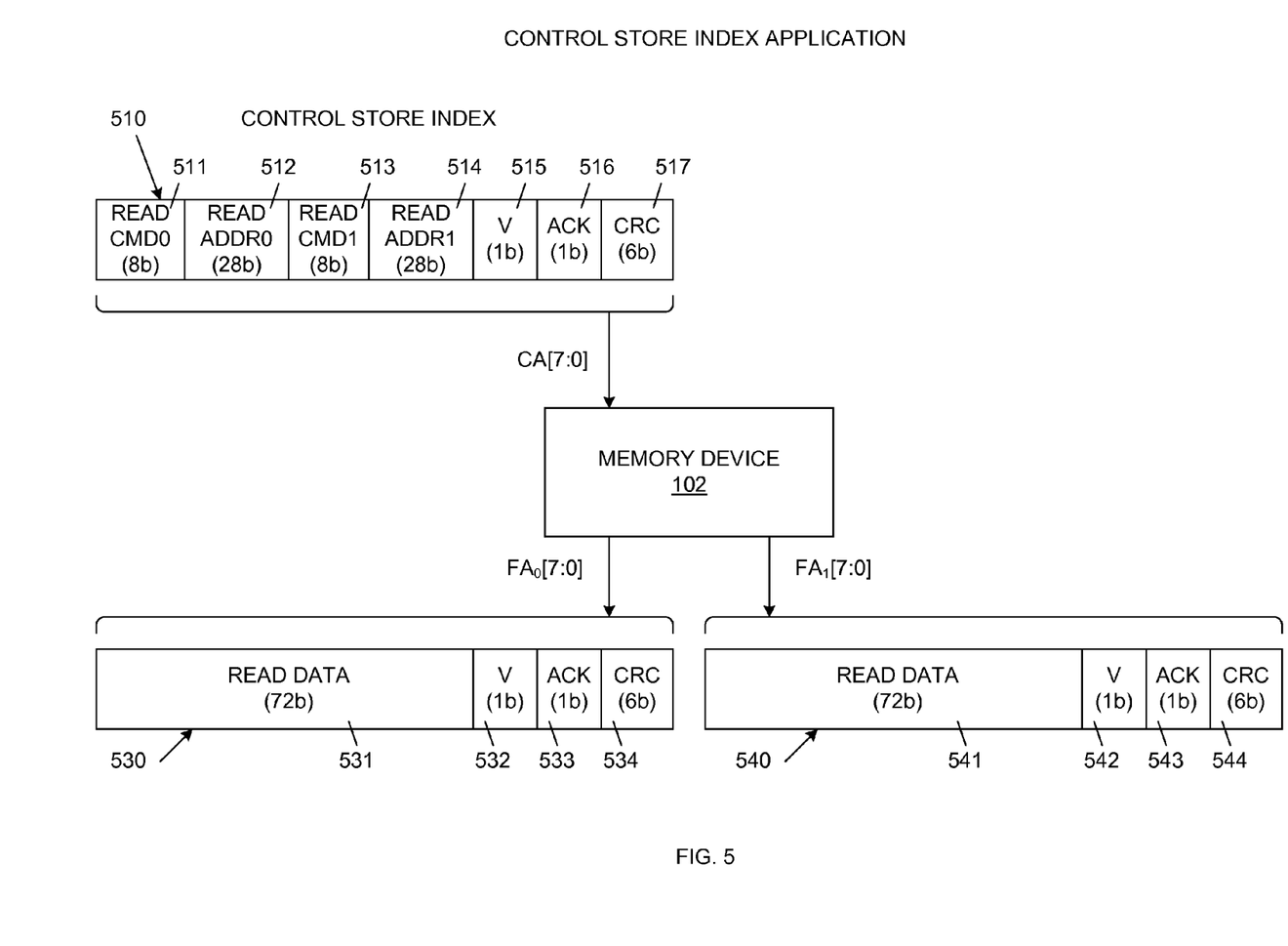
FIG. 5 is a block diagram illustrating a control store application in accordance with another embodiment of the present invention.

FIG. 5 is a block diagram illustrating a control store index application in accordance with another embodiment of the present invention. The control store index application can provide for high rate table indexing. A control store index instruction 510 includes an 80-bit frame value, which is provided to memory device 102 on serial links CA[7:0] over ten cycles (i.e., at a frequency of 1 GHz). The 80-bit control store index instruction 510 includes a first 8-bit read command 511, a first 28-bit read address 512, a second 8-bit read command 513, a second 28-bit read address 514, a 1-bit value 515 (which defines the transaction or data linkage layer, and is an instruction value for the memory or interface), a 1-bit acknowledge value 516, and a 6-bit CRC value 517.

The 80-bit control store index instruction 510 is processed by SerDes PHY 201 and chip input interface 202 in the manner described above, such that instruction decode and dispatch logic 210 receives the first 8-bit read command 511, the first 28-bit read address 512, the second 8-bit read command 513, and the second 28-bit read address 514. Instruction decode and dispatch logic 210 simultaneously initiates a first read operation in response to the first read command 511, and a second read operation in response to the second read command 513. The first read operation causes a 72-bit read data value 531 to be read from the address specified by the first read address 512. The second read operation causes a 72-bit read data value 541 to be read from the address specified by the second read address 514. In the described example, the first and second read operations are performed to different memory banks within the same memory partition. However, in other examples, the first and second read operations could be performed to different memory partitions. The 72-bit read data values 531 and 541 are simultaneously routed through data output multiplexer 215, and are processed by chip output interface 205 and SerDes PHY 206 in the manner described above, such that valid bit 532, acknowledge bit 533 and CRC bits 534 are added to the 72-bit read data value 531 to create an 80-bit output frame value 530, and valid bit 542, acknowledge bit 543 and CRC bits 544 are added to the 72-bit read data value 541 to create an 80-bit output frame value 540. These 80-bit output frame values 530 and 540 are transmitted from SerDes PHY 206 onto serial links $FA_0[7:0]$ and $FA_1[7:0]$ over ten cycles (i.e., at a frequency of 1 GHz). The frame store application exhibits a data transfer rate of 144 Gbps (i.e., two 72-bit words at 1 GHz read).

Note that control store index instructions can be continuously applied to memory device 102, as long as the control store index instructions access the memory partitions M0-M3 in a cyclic manner (e.g., control store index instructions 0, 1, 2, 3, 4, 5, 6, 7, etc. access memory partitions M0, M1, M2, M3, M0, M1, M2, M3, etc., respectively). Because each of the memory partitions M0-M3 operates at a relatively low frequency (e.g., 250 MHz), power consumption of the control store index application is relatively low, typically less than 7 Watts.

Figure 6:
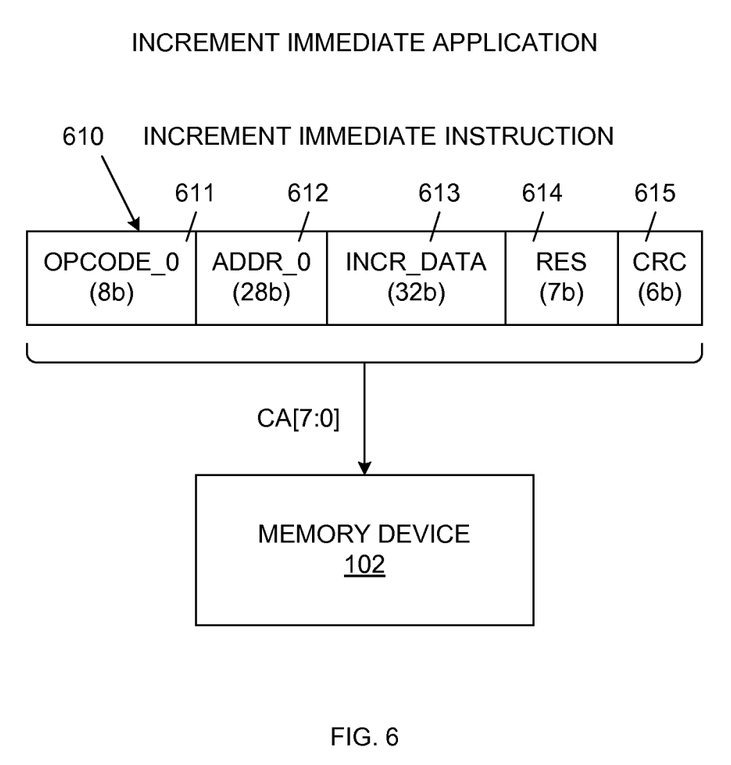
FIG. 6 is a block diagram illustrating an increment immediate application in accordance with another embodiment of the present invention.

FIG. 6 is a block diagram illustrating an increment immediate application in accordance with another embodiment of the present invention. The increment immediate application can provide for efficient statistics control (e.g., an increment/decrement function). An increment immediate instruction 610 allows the accessing device 101 to increment/decrement values stored in memory device 102 in an efficient manner. The increment immediate instruction 610 includes an 80-bit value, which can be provided to memory device 102 on serial links CA[7:0] over ten cycles (i.e., at a frequency of 1 GHz). The 80-bit increment immediate instruction 610 includes an 8-bit read-modify-write command 611, a 28-bit transaction address 612, a 32-bit immediate value 613, 7-bit reserved field 614, and a 6-bit CRC value 615.

The 80-bit increment immediate instruction 610 is processed by SerDes PHY 201 and chip input interface 202 in the manner described above, such that instruction decode and dispatch logic 210 receives the 8-bit read-modify-write command 611, the 28-bit transaction address 612, and the 32-bit immediate value 613. In response, instruction decode and dispatch logic 210 initiates a read operation. This read operation causes a 72-bit read data value to be read from one of the memory partitions M0-M3, from the address specified by transaction address 612. This 72-bit read data value is routed through data output multiplexer 215 to RMW logic 220. RMW logic 220 also receives the immediate value 613 from instruction decode and dispatch logic 210. RMW logic 220 adds the immediate value 613 to the retrieved 72-bit read data value, thereby creating a modified 72-bit data value. Instruction decode and dispatch logic 210 then performs a write operation, wherein the modified 72-bit data value is written back to memory core 125, at the address specified by transaction address 612. Because the increment immediate instruction 610 requires two successive accesses (read then write) to the memory partition identified by the transaction address 612, the accessing device 101 must not access this memory partition again until after the modified data value has been written back to the specified memory partition. In the described example, the operations specified by the increment immediate instruction 610 are completed at a frequency of 125 MHz (i.e., one read operation at 250 MHz and one write operation at 250 MHz).

As described in more detail below, the increment immediate instruction 610 advantageously allows read-modify-write operations to be performed within memory device 102, without burdening accessing device 101 or the interface between accessing device 101 and memory device 102.

Figure 7A:
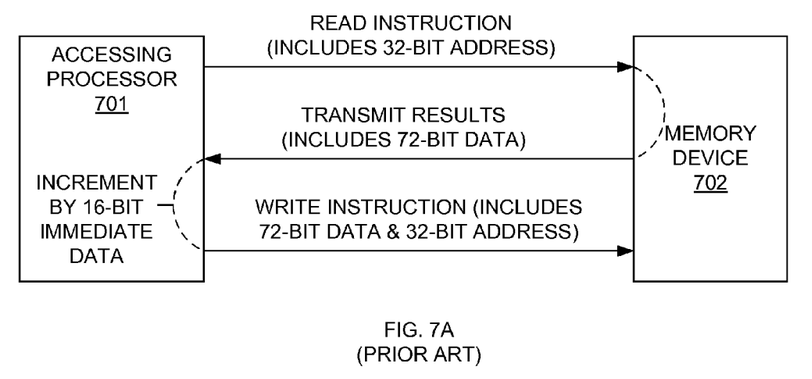
FIG. 7A is a block diagram of a conventional memory system, and illustrates the implementation of a conventional read-modify write operation between an accessing processor and a memory device.

FIG. 7A is a block diagram of a conventional memory system 700, which includes an accessing processor 701 and a memory device 702. To increment a memory value (counter) in memory device 702, the accessing processor 701 must transmit a read instruction to memory device 702. Memory device 702 must then perform a read operation to retrieve the memory value, and then transmit this retrieved memory value to the accessing processor 701. The accessing processor 701 must increment the retrieved memory value by an immediate value, thereby creating an incremented memory value. The accessing processor 701 must then transmit a write instruction to memory device 702, thereby instructing memory device 702 to write the incremented memory value back to the original memory location. This process requires a significant amount of bandwidth between the accessing processor 701 and the memory device 702. In addition, this process requires the accessing processor 701 to store the immediate value and keep track of the increment operation while memory system 702 is performing the read operation.

Figure 7B:
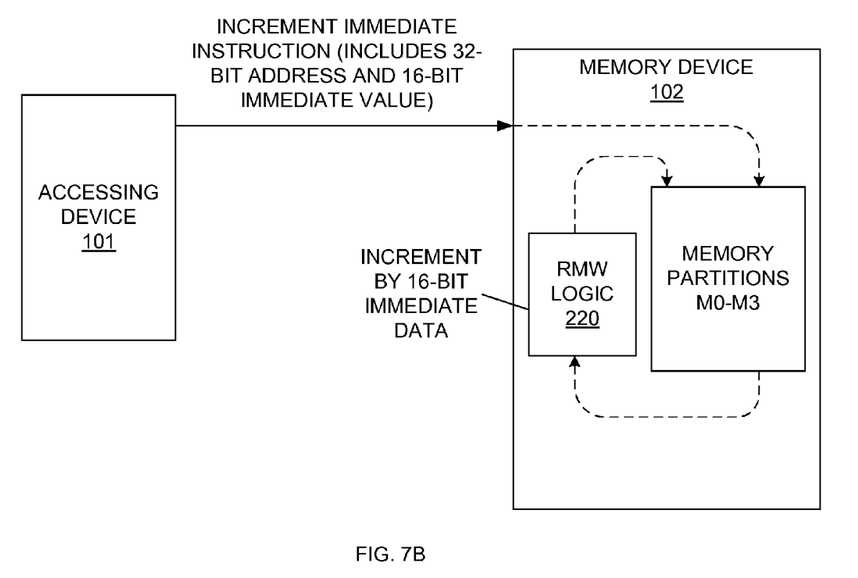
FIG. 7B is a block diagram illustrating a read-modify-write operation implemented by the increment immediate application of FIG. 6, in accordance with one embodiment of the present invention.

FIG. 7B is a block diagram that illustrates the operation of the increment immediate instruction 610. Accessing processor 101 transmits the increment immediate instruction 610 to memory device 102. At this point, accessing processor 101 has completed its role in the operation. That is, accessing processor 101 is not required to wait for results from memory device 102 or store the immediate data. Upon receiving the increment immediate instruction 610, memory device 102 reads the memory value to be incremented from the specified address within memory partitions M0-M3, and provides this memory value to RMW logic 220. Memory device 102 also provides the immediate value included in the increment immediate instruction to RMW logic 220. RMW logic 220 adds the immediate value to the retrieved memory value to create the modified memory value. Instruction decode and dispatch logic 210 then causes the incremented memory value to be written back to the associated address within the memory partitions M0-M3. Significant savings are realized, because I/O bandwidth, power and pins are only needed to perform one memory transaction between accessing device 101 and memory device 102.

The read-modify-write operation of the present example can be used for data manipulation (i.e., increment/decrement, semaphore, Boolean flag manipulation), pointer indirection for data structure walking, and/or data packing/unpacking (gear box to match packet quanta mismatch with internal memory word length). Although RMW logic 220 has been described in connection with incrementing a counter value, it is understood that RWM logic 220 can also be used to implement other operations, including, but not limited to, pointer modification, inserting an entry into a linked list (or other linked list manipulations), performing conditional store operations, or performing look-up table operations.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

We claim:

1. A memory device comprising:
   an input interface that receives instructions on a first plurality of serial links;
   a memory core comprising a plurality of memory partitions; and
   a memory controller coupled to receive the instructions from the input interface, and in response, initiate accesses to the memory partitions of the memory core in a cyclic manner, wherein the accesses are performed with a fixed latency from a time the input interface receives the instructions on the first plurality of serial links, wherein each of the accesses to the memory partitions is initiated in the memory partition with a fixed delay from a time the input interface receives the corresponding one of the instructions on the first plurality of serial links.

2. The memory device of claim 1, further comprising a clock terminal that receives a system clock signal, wherein the fixed latency is referenced to the system clock signal.

3. The memory device of claim 2, wherein the memory controller and the memory core operate synchronously in response to the system clock signal.

4. The memory device of claim 1, further comprising an output interface that provides data read from the memory core on a second plurality of serial links.

5. The memory device of claim 1, wherein the input interface performs a serial-to-deserial (SerDes) conversion.

6. The memory device of claim 1, wherein the memory controller accesses the plurality of memory partitions in an overlapping manner.

7. The memory device of claim 6, further comprising a multiplexer coupled to receive read data values read from the plurality of memory partitions, wherein the memory partitions operate at a first frequency, and the multiplexer routes the read data values at a second frequency, which is greater than the first frequency.

8. The memory device of claim 1, further comprising read-modify-write logic coupled to receive data values read from the memory core, and information from the memory controller.

9. The memory device of claim 8, wherein the information from the memory controller is derived from the instructions.

10. The memory device of claim 9, wherein the information from the memory controller comprises an immediate value to be added to a data value read from the memory core.

11. The memory device of claim 1,
    wherein the memory core comprises N memory partitions, and the memory controller initiates accesses in a cyclic manner, such that each of the N memory partitions is accessed, at most, once in every N accesses.

12. The memory device of claim 1, wherein the memory device does not perform arbitration in initiating accesses to the memory partitions.

13. The memory device of claim 1, wherein each of the accesses to the memory partitions comprises two simultaneous read accesses to two different memory banks within a given memory partition.

14. The memory device of claim 1, wherein each of the accesses to the memory partitions is initiated in the memory partition during a pre-assigned time slot.

15. A method comprising:
    providing instructions to a memory device on a first plurality of serial links;
    accessing a plurality of memory partitions within the memory device in a cyclic manner in response to the instructions, wherein each access to the memory partitions has a fixed access latency from a time a corresponding one of the instructions is provided to the memory device on the first plurality of serial links, wherein each of the accesses to the memory partitions is initiated in the memory partition with a fixed delay from a time a corresponding one of the instructions is provided to the memory device on the first plurality of serial links.

16. The method of claim 15, further comprising providing write data to the memory device on a second plurality of serial links.

17. The method of claim 16, further comprising providing read data from the memory device on a third plurality of serial links.

18. The method of claim 15, further comprising providing write data to the memory device on the first plurality of serial links.

19. The method of claim 18, further comprising providing read data from the memory device on a second plurality of serial links.

20. The method of claim 15, further comprising operating the memory partitions in a synchronous manner in response to a system clock signal, wherein the fixed access latency is derived from the system clock signal.

21. The method of claim 15, further comprising accessing the plurality of memory partitions in an overlapping manner.

22. The method of claim 21, further comprising:
    reading data values form the plurality of memory partitions in a cyclic overlapping manner, wherein each of the memory partitions operates at a first frequency; and
    multiplexing data values read from the plurality of memory partitions at a second frequency, which is greater than the first frequency.

23. The method of claim 15, further comprising:
    reading a data value from one of the plurality of memory partitions in response to one of the instructions;
    processing the data value in response to the one of the instructions, thereby creating a modified data value.

24. The method of claim 23, further comprising writing the modified data value back to one of the plurality of memory partitions.

25. The method of claim 23, wherein the step of processing the data value comprises incrementing the data value by an immediate value included in the one of the instructions.

26. The method of claim 15, wherein the plurality of memory partitions includes N memory partitions, and the N memory partitions are accessed in a cyclic manner, such that each of the N memory partitions is accessed, at most, once in every N accesses.

27. The method of claim 15, wherein arbitration is not performed in initiating accesses to the memory partitions.

28. The method of claim 15, wherein each access to the memory partitions comprises two simultaneous read accesses to two different memory banks within a given memory partition.

29. The method of claim 15, wherein each of the accesses to the memory partitions is initiated in the memory partition during a pre-assigned time slot.

* * * * *